W. H. MUZZY.
STORAGE BATTERY.
APPLICATION FILED FEB. 26, 1916.
1,243,202. Patented Oct. 16, 1917.
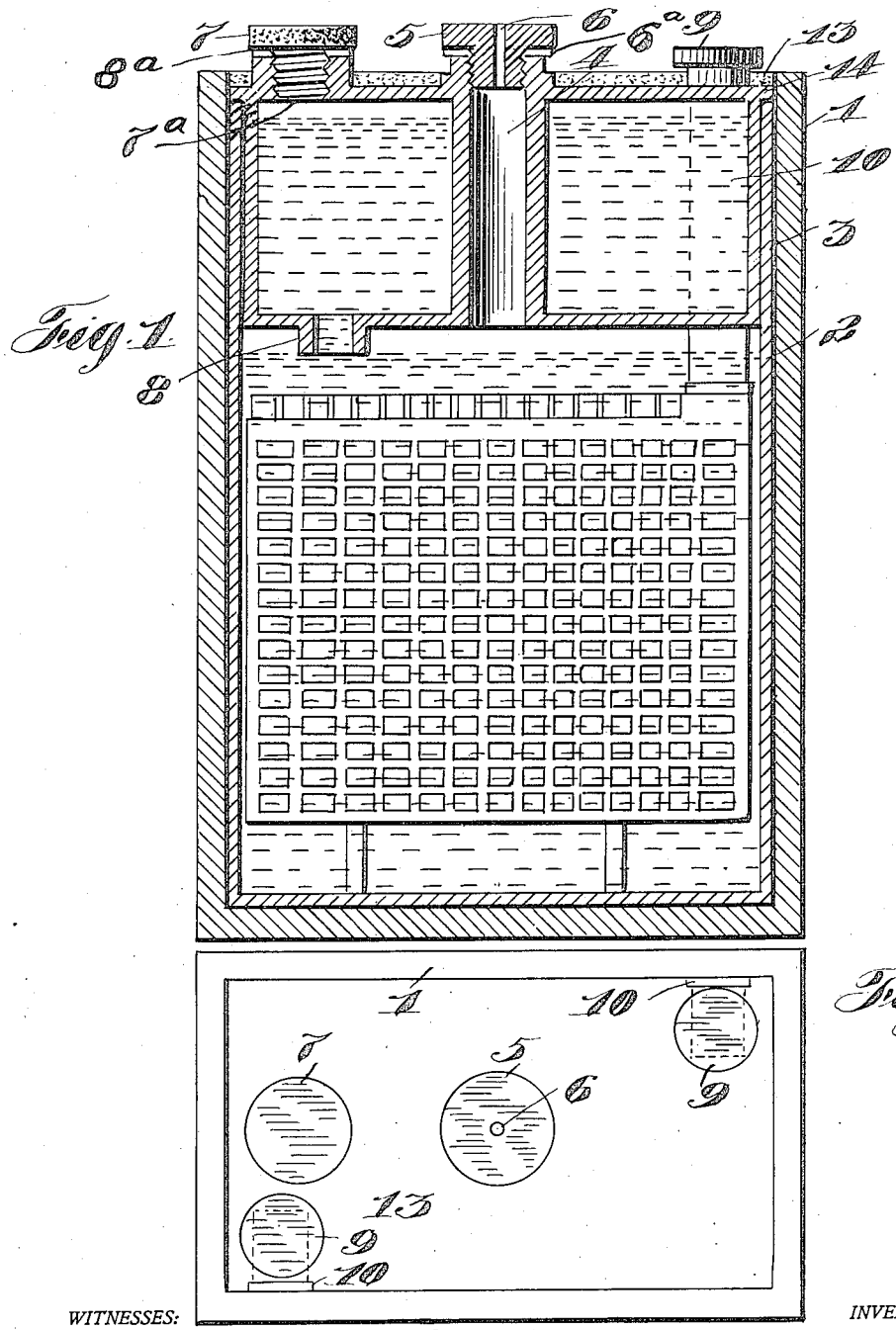

UNITED STATES PATENT OFFICE.

WILLIAM H. MUZZY, OF DAYTON, OHIO.

STORAGE BATTERY.

1,243,202. Specification of Letters Patent. Patented Oct. 16, 1917.

Application filed February 26, 1916. Serial No. 80,619.

*To all whom it may concern:*

Be it known that I, WILLIAM H. MUZZY, a citizen of the United States, residing at Dayton, in the county of Montgomery and State of Ohio, have invented certain new and useful Improvements in Storage Batteries, of which I declare the following to be a full, clear, and exact description.

This invention relates to improvements in storage batteries and has more particular relation to an improved battery in which the evaporated water is automatically replaced.

The object of the invention is to provide a storage battery with a supply tank of distilled water which is automatically fed to the battery as the liquid in the battery evaporates because of the charging action.

Another object of the invention is to feed fresh water to a storage battery from an independent sealed controlled tank.

The invention consists of certain novel constructions, combinations and arrangements of parts all of which will be hereinafter more particularly set forth and claimed.

In the accompanying drawings forming part of this specification,

Figure 1 represents a central vertical section through a storage battery embodying my invention and Fig. 2 represents a top plan view of the same.

The care of storage batteries used in connection with the starting, lighting and ignition systems of automobiles is a constant source of annoyance as the evaporated water of the battery must be constantly replaced with distilled water. This refilling operation must take place about every two weeks or oftener if the machine is used a great deal. The batteries are always located in some inaccessible part of the machine and are therefore neglected and not refilled with water when they should be. The result of this neglect is that the upper part of the battery is ruined.

With the present invention this difficulty is overcome and sufficient water is held in the storage tank to supply the battery proper for several months.

Described in detail the battery consists of an outer wooden case 1 containing a hard rubber jar 2 within which are mounted the usual battery plates.

A tank 3 of hard rubber is mounted in the upper end of the tank 2 and supported in position by a flange 14 formed thereon and resting upon the upper edge of tank 2. The tank 3 is formed with a central vertical passage 4 to allow the escape of the gas when the battery is being charged. This passage is closed at its upper end with a screw stopper 5 having a vent 6 and a rubber packing gasket 6ª.

The tank 3 is provided with filling opening 7ª closed by a screw stopper 7 and a rubber gasket 8ª. A short discharge tube 8 projects below the tank 3 to the level at which it is desired to keep the liquid in the battery.

The positive and negative plates of the battery are connected by metal straps 10 with binding terminal screws 9 on top of the tank 3; said straps passing up the sides of the tank.

The operation of the devices is as follows:

When the liquid in the tank 2 evaporates sufficiently to uncover the lower end of the tube 8, air passes up the tube into the vacuum tank 3 and permits part of the water to descend until the lower end of the tube is again covered when the flow will cease because of the partial vacuum created in the upper part of the tank 3. When the water again descends below the lower end of the tube 8 the operation is automatically repeated. The liquid in the tank 2 will thus be kept at a constant level.

When the tank 3 is to be refilled the stopper 5 is first removed and replaced with a solid stopper similar to stopper 7. This closes the passage 4 air tight and the stopper 7 is then removed and the tank 3 filled through the opening 7ª. The water cannot pass down the tube 8 at this time as the air in the tank 2 and passage 4 cannot escape and will thus prevent the entrance of any water.

After the tank 3 is filled the stoppers 5 and 7 are again placed in position as shown in Fig. 1; the stopper 7 being first placed in position and then the stopper 5.

In order to seal the tank 2 air tight, except for the passage 4, the sides of the case 1 are extended and soft tar 13 or its equivalent is run over the entire top as shown in Fig. 1.

Where a battery consists of a number of cells there would be a tank 3 for each cell but a single tank might be provided having independent compartments one for each cell.

It will of course be understood that another operation for filling would be to place the finger over the vent 6 in the stopper 5 during the filling operation and thus prevent the escape of air which would be necessary to allow any undue amount of water to flow into the battery while the sealing stopper 7 is removed.

Having thus described the invention what is claimed as new and desired to secure by Letters Patent is:

1. In a storage battery the combination with a battery jar and battery elements, of a water tank completely sealing the upper end of the jar and formed with a discharge opening and a filling opening, a stopper for the filling opening, a vent tube for the battery jar and means for closing the tube.

2. In a storage battery the combination with a battery jar and battery elements of less height than the jar, of a sealed stationary water tank located within and completely sealing the upper end of the jar and formed with a discharge opening, a filling opening and a vent tube, a sealing stopper for the filling opening, and means for closing the tube.

3. In a storage battery the combination with a battery proper, of a sealed water tank mounted therein and completely sealing the battery, and having a vent passage, a filling opening, and a discharge opening, and stoppers for the vent passage and filling opening for sealing them.

4. In a storage battery the combination with an outer containing case of a battery jar and battery elements, a water tank completely closing the upper end of the jar, and formed with a discharge and a filling opening, a stopper for the filling opening, sealing material over the top of the water tank but within the outer case, and a vent for the battery with means for opening and closing the vent.

5. In a storage battery the combination with a sealed battery jar having battery elements, of an air vent for the jar arranged to be sealed and unsealed at will, a water tank having sealed connection with the jar and formed with a discharge opening and a filling opening, and a device for sealing the filling opening, the construction being such that only a limited amount of water may pass into the jar during the filling operation.

In testimony whereof I affix my signature in the presence of two witnesses.

WILLIAM H. MUZZY.

Witnesses:
CAROLYN APPLE,
EDNA A. HOCKEY.